United States Patent
Luh et al.

(10) Patent No.: US 9,815,327 B2
(45) Date of Patent: Nov. 14, 2017

(54) QUICK RELEASE APPARATUS FOR BICYCLE TIRE OR TUBE

(71) Applicant: National Taipei University of Technology, Taipei (TW)

(72) Inventors: Yuan-Ping Luh, Taipei (TW); Hong-Wai Iao, Taipei (TW)

(73) Assignee: NATIONAL TAIPEI UNIVERSITY OF TECHNOLOGY, Taipei (TW)

( * ) Notice: Subject to any disclaimer, the term of this patent is extended or adjusted under 35 U.S.C. 154(b) by 0 days.

(21) Appl. No.: 14/844,530

(22) Filed: Sep. 3, 2015

(65) Prior Publication Data

US 2017/0066284 A1    Mar. 9, 2017

(51) Int. Cl.
| | |
|---|---|
| B60B 25/00 | (2006.01) |
| B60B 1/00 | (2006.01) |
| B60B 25/16 | (2006.01) |
| B60B 25/12 | (2006.01) |

(52) U.S. Cl.
CPC ............ B60B 25/002 (2013.01); B60B 1/003 (2013.01); B60B 25/12 (2013.01); B60B 25/16 (2013.01); *B60B 2900/521* (2013.01); *B60B 2900/541* (2013.01); *B60Y 2200/13* (2013.01)

(58) Field of Classification Search
CPC ......... B60B 23/00; B60B 23/10; B60B 25/04; B60B 25/08; B60B 25/16; B60B 27/023; B60B 27/026; B62K 25/02
USPC .............. 301/10.1, 12.1, 23, 30, 35.2, 124.2
See application file for complete search history.

(56) References Cited

U.S. PATENT DOCUMENTS

| | | | | |
|---|---|---|---|---|
| 1,270,130 A | * | 6/1918 | Edelen | .................... B60B 25/02 301/30 |
| 1,657,833 A | * | 1/1928 | Lehman | ................... B60B 25/20 301/23 |
| 3,063,488 A | * | 11/1962 | Bennett | ................... B60B 25/16 152/10 |
| 3,494,404 A | * | 2/1970 | Parr | ....................... B60B 25/02 152/402 |
| 3,759,307 A | * | 9/1973 | Walther | .................. B60B 25/20 152/396 |
| 7,090,308 B2 | * | 8/2006 | Rose | ....................... B62K 25/02 301/110.5 |
| 7,284,584 B2 | * | 10/2007 | Kimura | ..................... B60B 1/06 152/396 |
| 7,523,998 B2 | * | 4/2009 | Yu | .......................... B62K 25/02 301/124.2 |

FOREIGN PATENT DOCUMENTS

JP    02041902    *    2/1990    ............. B60B 25/08

* cited by examiner

*Primary Examiner* — Jason R Bellinger
(74) *Attorney, Agent, or Firm* — Muncy, Geissler, Olds & Lowe, P.C.

(57) ABSTRACT

A quick release apparatus for a bicycle tire or tube is provided, which reduces time and effort spent in changing the tire or tube. A main wheel frame and a sub wheel frame are provided. These two frames with rim respectively can be assembled to construct a complete wheel frame set. When said main wheel frame connects with the sub wheel frame, it provides a complete rim with two walls for containing the tube. When said main wheel frame leaves said sub wheel frame, it generates a gap between these two frames for removing the tube easily.

3 Claims, 8 Drawing Sheets

QUICK RELEASE APPARATUS FOR BICYCLE TIRE OR TUBE

BACKGROUND OF THE INVENTION

Field of the Invention

The invention relates to a quick release apparatus, especially a quick release apparatus on the rim of the bicycle wheel for a bicycle tire or tube, used to directly remove the tire of bicycles from the frame without using tire spoons or deflating air from the tube in advance.

Description of Related Art

Quick release mechanisms are widely used on bicycles, including the wheels, seats or several parts of bicycles. These quick release mechanisms basically aim to disconnect parts of the bicycles without extra tools. Among them, the quick release apparatus used for removing the front wheel from the front forks of bicycles is now one of the most common types of quick release mechanism. This apparatus is usually designed to remove the bicycle wheel for more compact storage, prevent the wheel from being stolen, or replace the tire or the tube quickly.

However, without using a tire spoon or deflating air from the tube in advance, it is still a hard work to remove the tire and the tube from the rim of bicycles. Therefore, an object of present invention is to provide a structure and a simple and straightforward quick release mechanism on the rim of the bicycle wheel which enables removal of the tire or tube directly without tools, saving both time and effort.

SUMMARY OF THE INVENTION

The main purpose of the present invention is to provide a quick release apparatus on the rim of the bicycle wheel for removing a bicycle tire or tube which saves both time and effort for replacing or repairing a tire or tube.

To achieve the aforementioned purpose, this invention of a quick release apparatus for a bicycle tire or tube comprises a main wheel frame and a sub wheel frame. These two frames with rims respectively can be assembled to construct a complete wheel frame set. The quick release apparatus for bicycle tire or tube changing further comprises an inner spring, an outer spring, a sleeve tube and a quick release hub axle. These are the parts which allow the user to adjust the status of attachment among the main wheel frame and the sub wheel frame. When said main wheel frame leaves said sub wheel frame, a gap is created between these two frames. Since the tire of the bicycle is no longer locked by both the tube full with air and the fixed structure of the rim, said tire is easily removable.

Said main wheel frame comprises a hub pipe which is hollow and has two opens. There is a flange circumferentially set on the outer surface of the hub pipe along a direction which perpendicular to the axis of the hub pipe, dividing the hub pipe into two sections which can be seen from its appearance. The flange is a disk which has multiple spokes extended for connecting a main rim of said main wheel frame. From the vertical section view of said main rim, the main rim comprises a first tire wall which is connected to an edge of a rim well, which looks similar to the shape of letter "L" from the vertical section view. This provides an open space for containing the tube of the wheel. Another edge of said rim well, which is the bottom right edge of the letter "L" from its appearance, is a first connecting surface.

Said sub wheel frame comprises a ring in its center which is attached with multiple spokes which extend to connect a sub rim. From the vertical section view of said sub rim, the sub rim comprises a second tire wall which looks like the shape of letter "I." The second connecting surface is a surface on the side of the second tire wall, which is roughly on the bottom of a side of the letter "I."

A section of said hub pipe can be inserted through said ring for assembling the main wheel frame and the sub wheel frame. When said flange attaches to the ring of the sub wheel frame, said first connecting surface also connects to said second connecting surface, which makes the L-shape connect with the I-shape and then constructs a shape similar to letter "U" from the vertical section view of the rim. The hollow space of said U-shape is the space in which the tube of the wheel is located. When said flange moves alongside the hub pipe and is no longer attached with the ring of the sub wheel frame, said first connecting surface also leaves said second connecting surface in the instance, and the U-shape rim is now separated apart for generating the gap between L-shape and I-shape. This provides a space for the user to remove the tire then the tube from the wheel more easily.

Said main rim further comprises multiple corresponding matching slots. These matching slots are set alongside the first connecting surface of the main rim. Said matching slots are mainly set next to where the spokes of the main wheel frame connect to the main rim. The spokes of the sub wheel frame are set into these matching slots, so that when said main rim is pulled to move away from said sub rim along a direction substantially perpendicular to the spokes, the matching slots would block the spokes of the sub wheel frame for constraining these spokes in a pre-set range. This determines the patterns of assembling for the main connecting surface and the sub connecting surface, in order to strengthen the solidity and make the entire rim assemble correctly.

Moreover, there is an inner spring set between the flange of the main wheel frame and the ring of the sub wheel frame, making said ring able to arrange positions on that section of said hub pipe. When compressing said inner spring, said flange can reach the ring of the sub wheel frame. When said inner spring is released, the flange separates from the ring of the sub wheel frame and also separates the main connecting surface from the sub connecting surface.

The present invention also comprises a sleeve tube. Said sleeve tube mounts on said section of the hub pipe and attaches to said ring of the sub wheel frame. The combination of said sleeve tube and the ring of the sub wheel frame covers said section of the hub pipe but leaves an opening on a cap for connecting the inside hollow space of said hub pipe. The whole combination part of said sleeve tube and the ring of the sub wheel frame can arrange positions on the section of the hub pipe as well.

The apparatus also contains a quick release hub axle, which is used to control the apparatus of the present invention. The quick release hub axle has two ends. A first end of the quick release hub axle is inserted into said hub pipe from the side without the sleeve tube, penetrates the cap of the sleeve tube, and exposes from another side. A quick release lever is set on said another second end of the quick release hub axle. A bicycle fork set usually has two forks. The first fork is set to catch the quick release hub axle on the location between said quick release lever and said hub pipe.

Furthermore, the first end of the quick release hub axle sets with a bar cap. A blocking ring is set onto the quick release hub axle outside said cap, making said cap located between the hub pipe and the blocking ring. The second fork of the bicycle forks set is set onto the quick release hub axle between said blocking ring and said bar cap. An outer spring is set between the second end of the fork and the bar cap.

When said quick release lever is fastened, the outer spring is compressed to make said flange attach to the ring of the sub wheel frame, which makes said main connecting surface attach to said sub connecting surface as well. When said quick release lever is released, both of the outer spring and the inner spring extend for separating said main connecting surface and said sub connecting surface, which pushes said gap between the flange and the ring of the sub wheel frame.

DETAILED DESCRIPTION OF THE INVENTION

To provide better understanding of the quick release apparatus for bicycle tire or tube of the present invention, several preferred embodiments of present invention are shown in this section.

Figure 1:
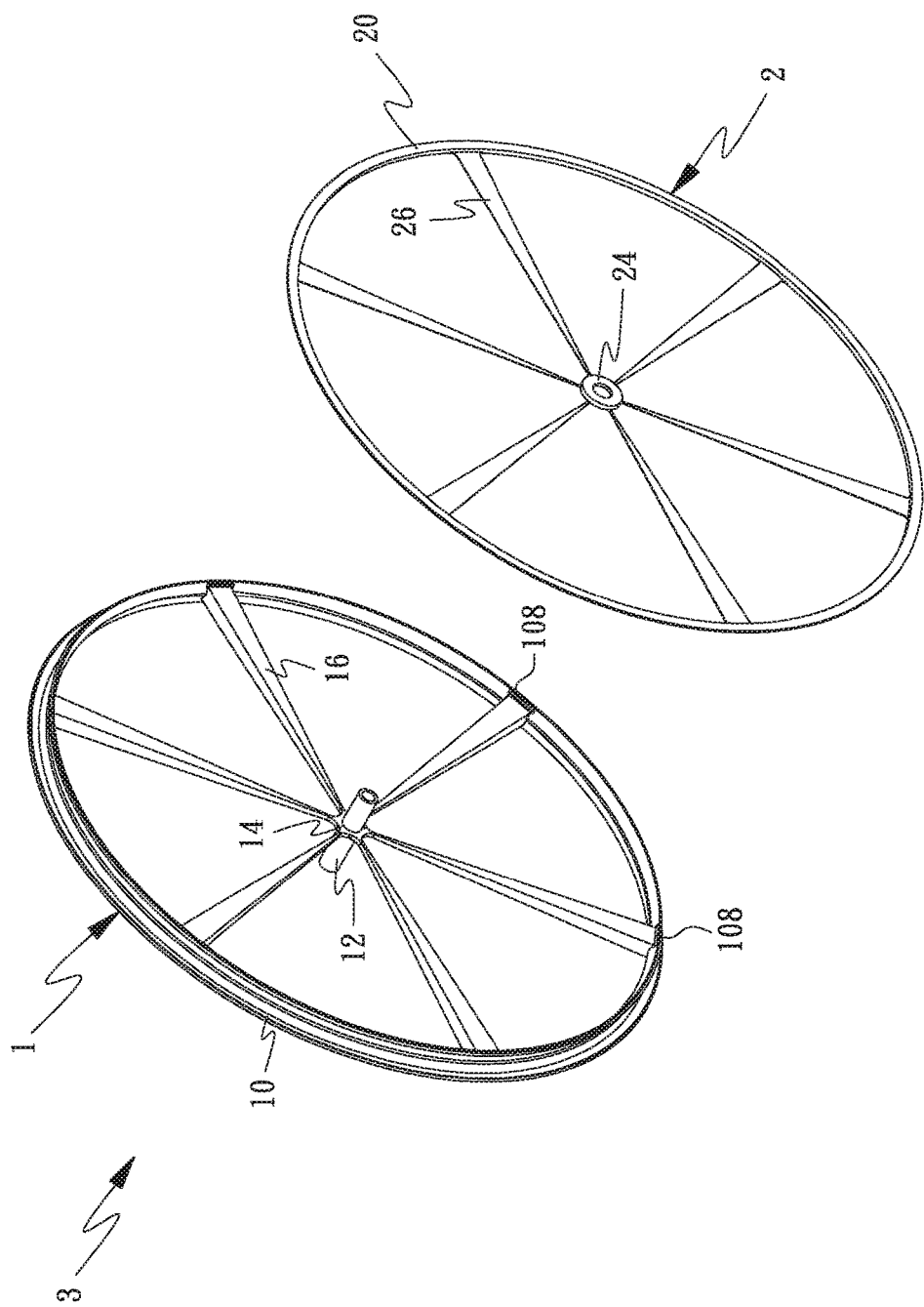
FIG. 1 is a perspective view of the wheel frame set 3 in which said main wheel frame 1 and said sub wheel frame 2 are separated.

Firstly, please refer to FIG. 1, which displays the perspective view of the wheel frame set 3 in which said main wheel frame 1 and said sub wheel frame 2 are separated.

The main wheel frame 1 comprises the main rim 10, the hub pipe 12, the flange 14, and several spokes 16. The flange 14 surrounds the hub pipe 12 which is located in the center of the wheel and divides the hub pipe 12 in to a left section and a right section from the appearance. The openings of both two ends of hub pipe 12 are still connected from the inside. Multiple spokes 16 extends from the flange 14 to reach and connect the inner side of the circle of said main rim 10.

The sub wheel frame 2 comprises the sub rim 20, the ring 24, and multiple spokes 26. Said spokes 26 connect the ring 24 in the center with the outer circle-shaped sub rim 20.

Figure 2:
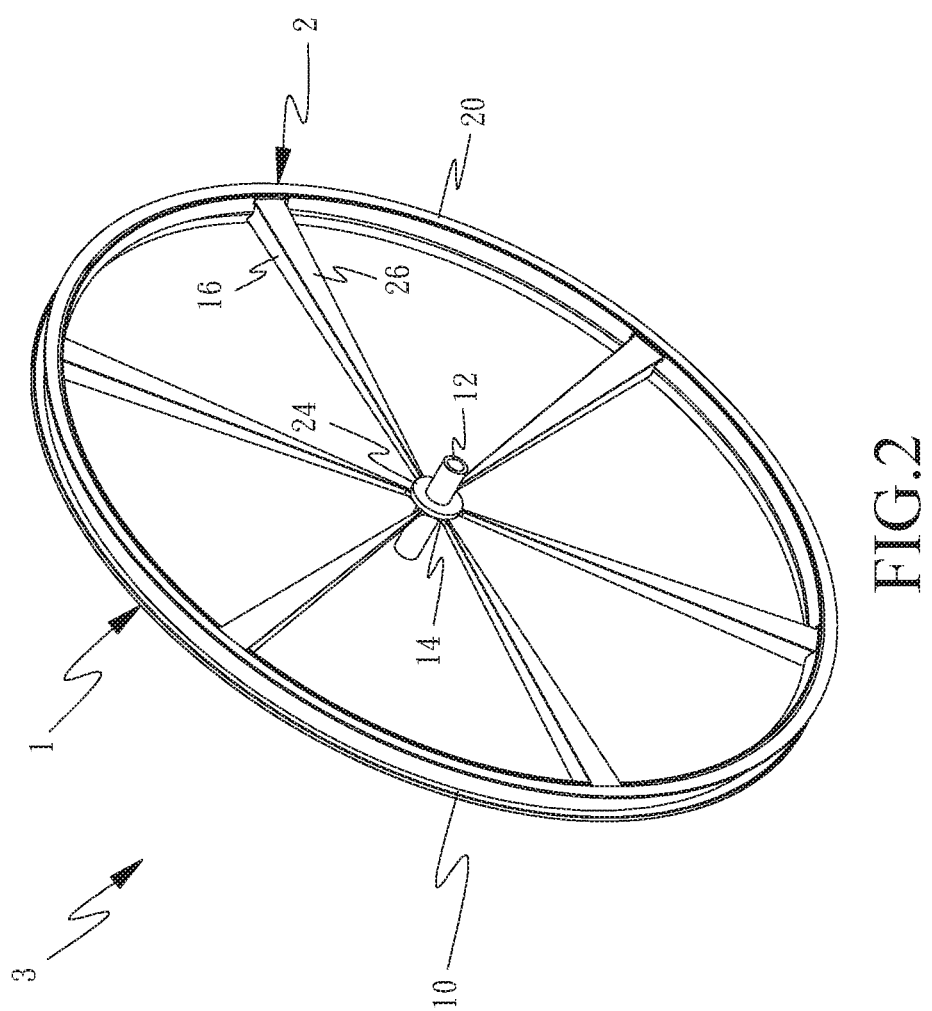
FIG. 2 is a perspective view of the wheel frame set 3 in which said main wheel frame 1 and said sub wheel frame 2 are assembled.

Secondly, please see FIG. 2, which shows the perspective view of the wheel frame set 3 in which said main wheel frame 1 and said sub wheel frame 2 are assembled. The right section of the hub pipe 12 is inserted into the ring 24, which allows the ring 24 to move upon the right section of the hub pipe 12. When the ring 24 is pushed to the bottom of the right section of the hub pipe 12, the ring 24 can attach to the flange 14 with no gap between them. This also drives the main rim 10 to attach with the sub rim 20, so that the wheel frame set 3 is now under the attached form. When the wheel frame set 3 is under the released form, the ring 24 is pulled to leave the bottom of the right section of the hub pipe 12 and there is a gap between the ring 24 and the flange 14. This also generates a gap between the main rim 10 and the sub rim 20.

Figure 3A:
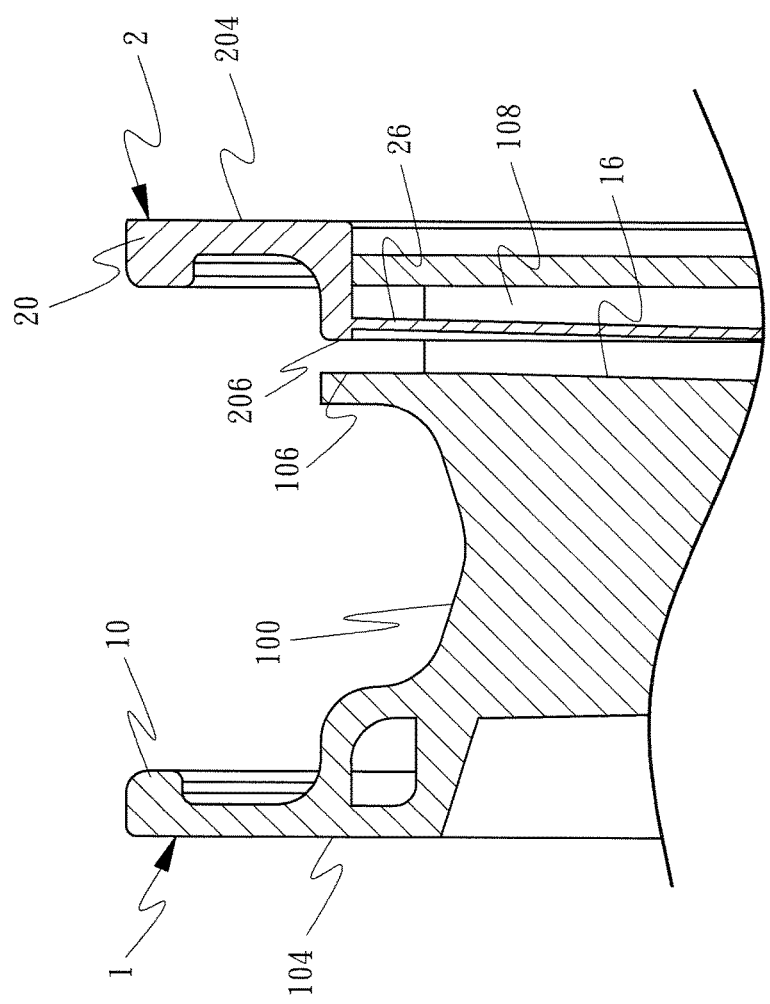
FIG. 3A shows the circumstance of the rims of the wheel frame set 3 under the released form.
Figure 3B:
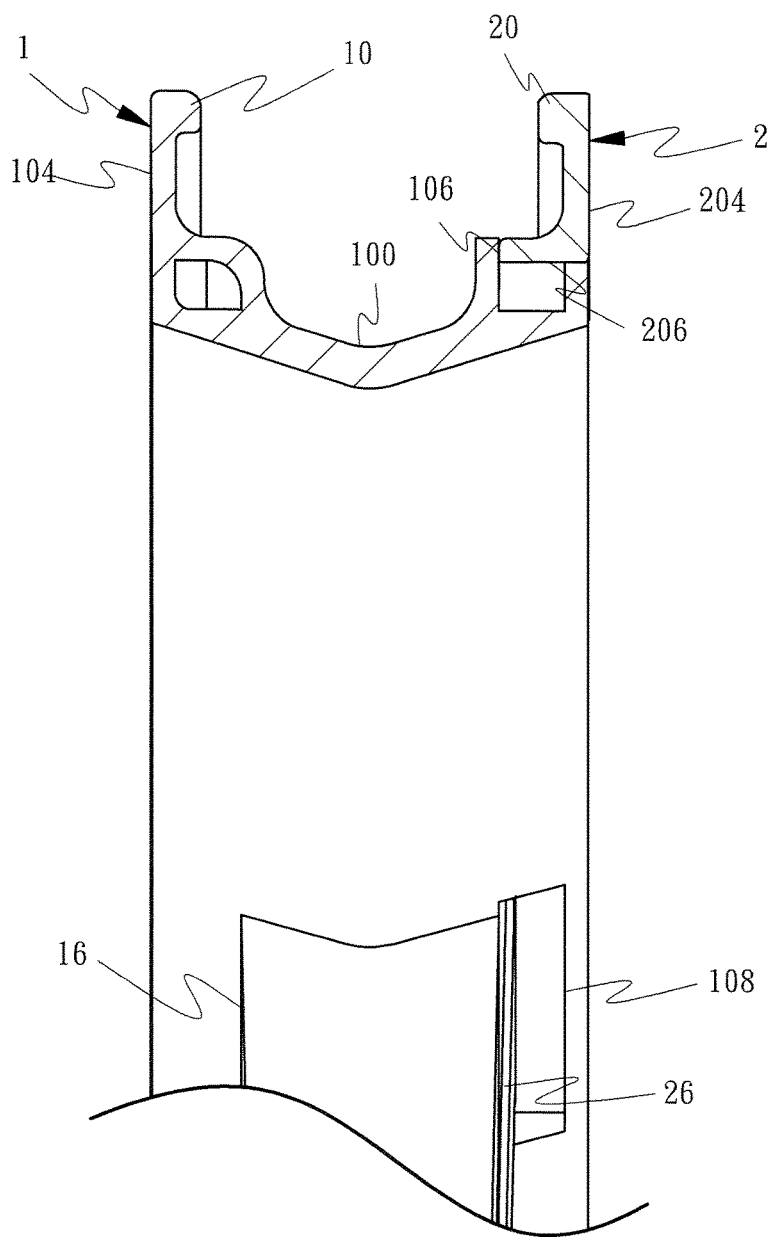
FIG. 3B shows the circumstance of the rims of the wheel frame set 3 under the attached form.

Next, please refer to FIG. 3A and FIG. 3B for sectional views of the rims of the wheel frame set 3 under the released form or the attached form. FIG. 3A shows the circumstance of the rims of the wheel frame set 3 under the released form. This figure only displays part of the main wheel frame 1, in which the main rim 10 connects to a spoke 16. The main rim 10 comprises the rim well 100, the first tire wall 104, the first connecting surface 106, and one of the matching slots 108. The sectional view is set along the spokes of both the main wheel frame 1 and the sub wheel frame 2. An edge of the containing bed 100 connects to the first tire wall 104 vertically and another edge of the containing bed 100 is the first connecting surface 106, which creates a tube containing space for the tube of the bicycle to be placed. The matching slot 108 is set alongside the main rim 10 right next to the spoke 16. Furthermore, the figure also shows a part of the sub wheel frame 2, where a spoke 26 of the sub wheel frame 2 extends through the matching slot 108 to connect with the sub rim 20. The matching slot 108 blocks the spoke 26 in this instance for constraining the release range since the sub wheel frame 2 is no longer attached to the main wheel frame 1. The sub rim 20 further comprises a second tire wall 204 which has a second connecting surface 206 on one side. A gap is generated between the second connecting surface 206 and the first connecting surface 106, which makes the tire of the bicycle no longer locked by the rims.

FIG. 3B shows the circumstance of the rims of the wheel frame set 3 under the attached form. The main rim 10 attaches to the sub rim 20 by connecting the first connecting surface 106 with the second connecting surface 206. The first tire wall 104, the rim well 100 and the second tire wall 204 together form a U-shape space which is used to place the tube of the wheel.

Figure 4:
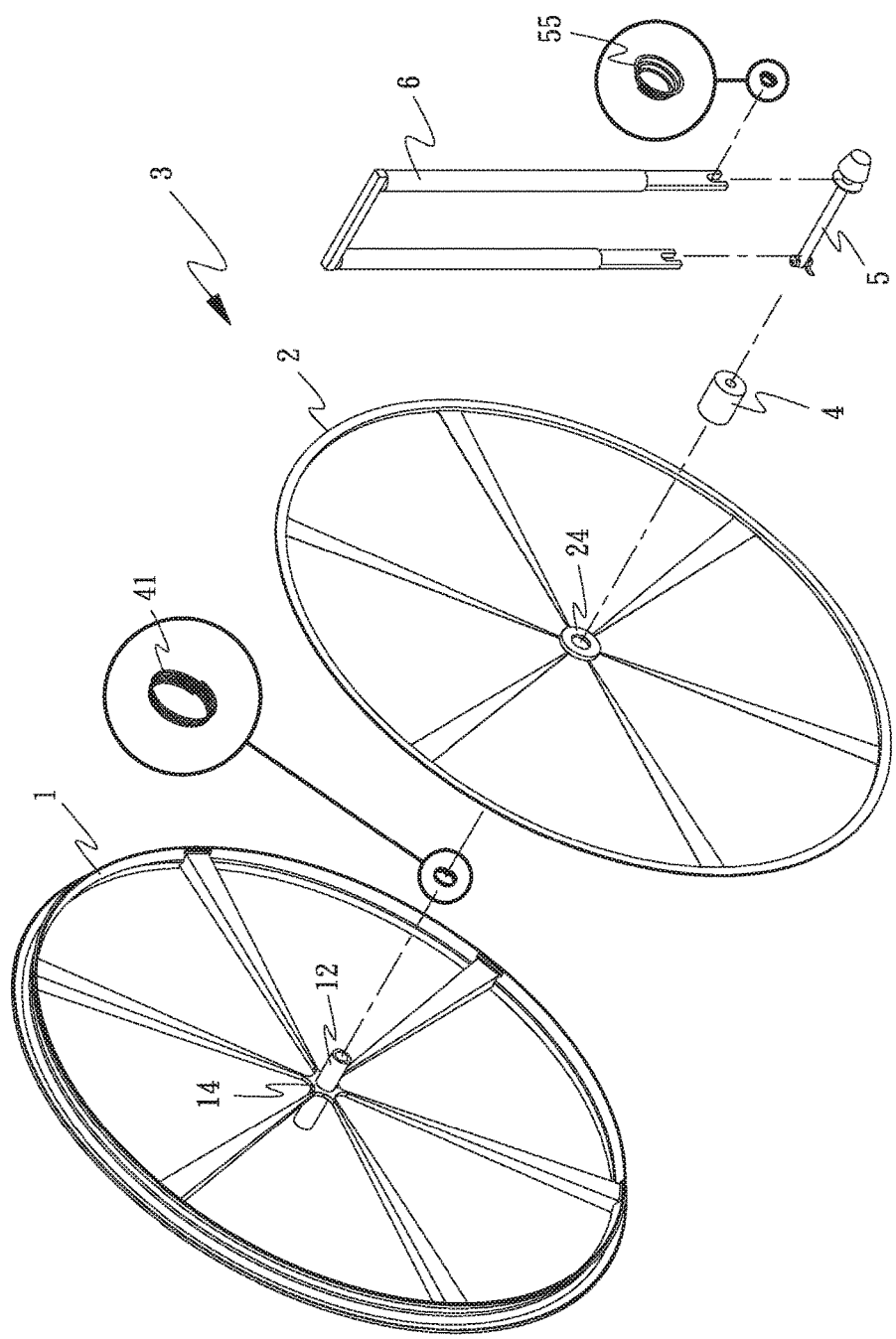
FIG. 4 is a perspective view of the rim quick release apparatus for bicycle tire or tube changing with all parts separated.
Figure 5:
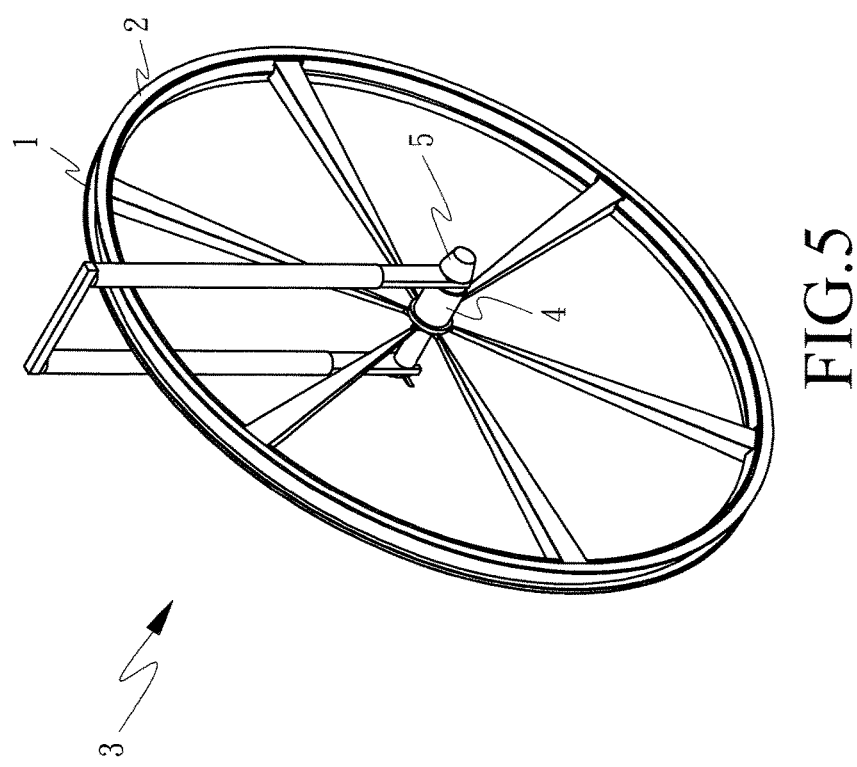
FIG. 5 is a perspective view of the rim quick release apparatus for bicycle tire or tube changing with all parts assembled.

FIG. 4 provides a perspective view of the whole quick release apparatus for bicycle tire or tube with all parts separated. The quick release apparatus for bicycle tire or tube comprises the wheel set 3 which contains the main wheel frame 1 and the sub wheel frame 2, the sleeve tube 4, the quick release hub axle 5, the bicycle fork set 6, the inner spring 41, and the outer spring 55. The inner spring 41 should be set between the ring 24 and the flange 14, and the outer spring 55 should be set on the quick release hub axle 5 and locates on the outer side of the bicycle fork set 6. When the whole rim quick release apparatus is assembled, please see FIG. 5, in which the sleeve tube 4 is connected to the ring 24 of the sub wheel frame 2 and mounted onto the right section of the hub pipe 12. The quick release hub axle 5 is the axle which should be inserted through both of the sleeve tube 4 and the hub pipe 12 for combining said quick release apparatus for bicycle tire or tube.

Figure 6:
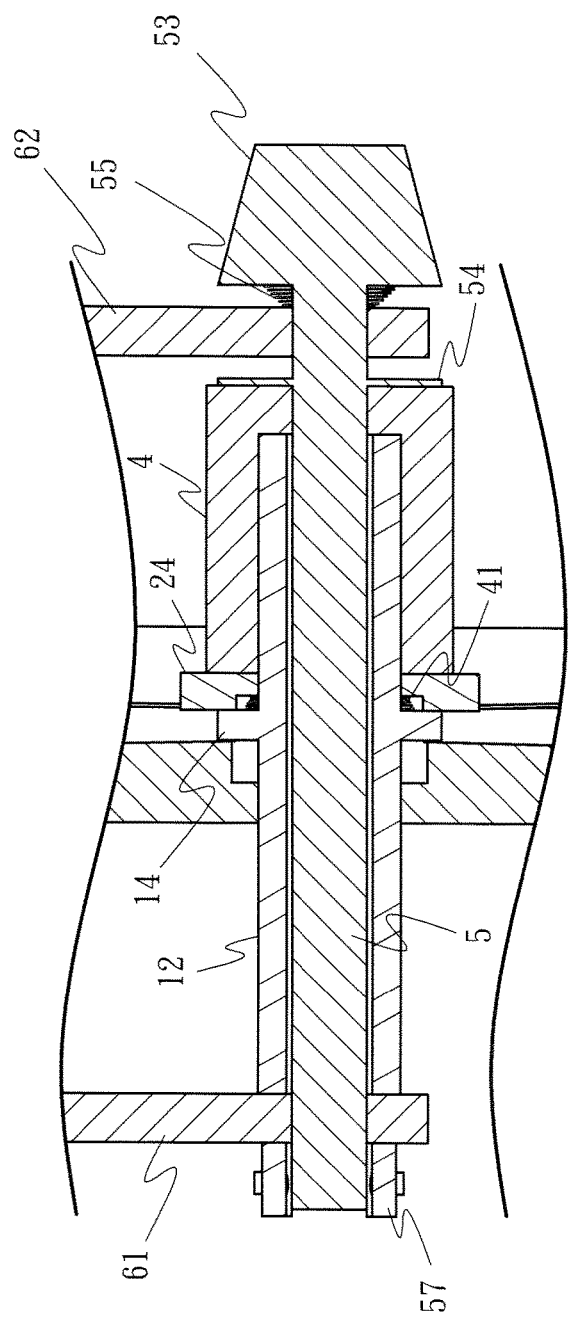
FIG. 6 is a sectional view through the central axle of the quick release apparatus for bicycle tire or tube after assembling in an attached state.

Then, please refer to FIG. 6 for the sectional view through the central axle of the quick release apparatus for bicycle tire or tube after assembling under the attached form. The sleeve tube 4 is connected to the ring 24 of the sub wheel frame 2 and mounted onto the right section of the hub pipe 12, and there is an inner spring 41 set between the ring 24 of the sub wheel frame 2 and the flange 14 of the main wheel frame 1. The releasing of the inner spring 41 can provide the power to push the ring 24 from the flange 14. The main structure of said quick release hub axle 5 has two ends. One first end of the quick release hub axle 5 is inserted from the opening of the left section into the hub pipe 12. The quick release lever 57 is set on another second end of said quick release hub axle 5.

Said first end of said quick release hub axle 5 passes through the inner space of the hub pipe 12 and the sleeve tube 4, then exposes from another side of the hub pipe 12. On this end sets with a bar cap 53, there is a blocking ring 54 set on the quick release hub axle 5 in a certain distance from the bar cap 53, which aims to block the range of moving for the sleeve tube 4. An outer spring 55 is set between the bar cap 53 and the blocking ring 54 which provides the power for pushing the quick release hub axle 5 when being released. There is a bicycle fork set 6 which contains two forks. One fork 61 connects to the quick release hub axle 5 on the section between said hub pipe 12 and said quick release lever 57, and another fork 62 connects to the quick release hub axle 5 in the other end on the section between said blocking ring 54 and said outer spring 55.

Figure 7:
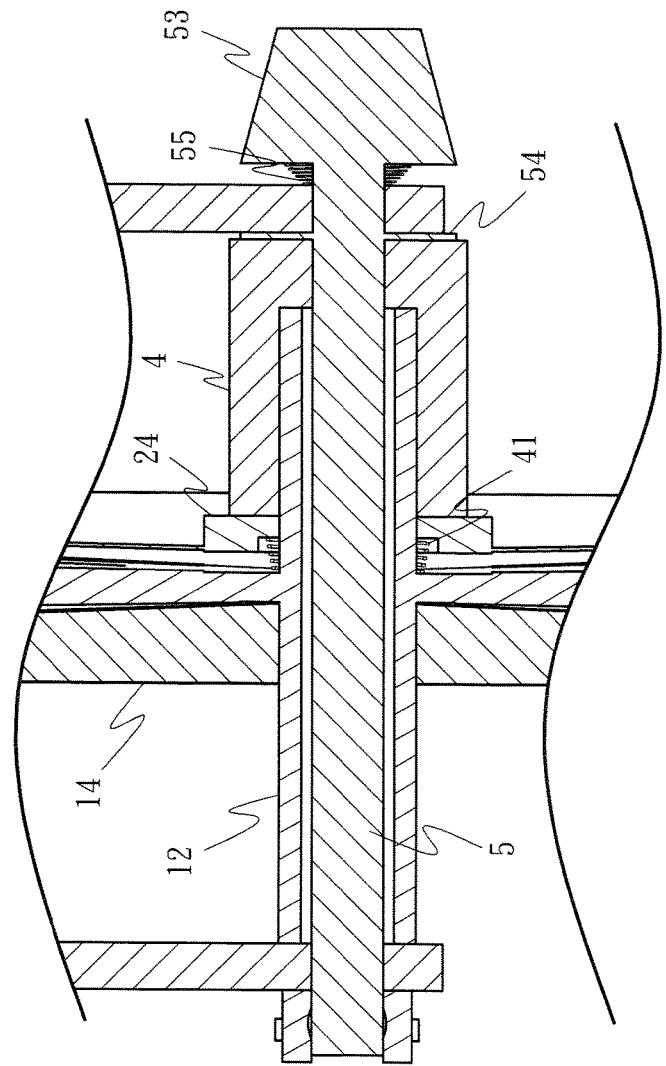
FIG. 7 is a sectional view through the central axle of the quick release apparatus for bicycle tire or tube after assembling in a released state.

When the quick release lever 57 is locked, it compresses both the outer spring 55 and the inner spring 41, so that said wheel frame set 3 is under attached form. When the quick release lever is released, both the inner spring 41 and the outer spring 55 are released as well, and said wheel frame set 3 now changes to released form. This can be seen from the FIG. 7, which is a sectional view through the central axle of the quick release apparatus for bicycle tire changing after assembling under the released form.

To conclude, comparing the present rim quick release apparatus for bicycle tire or tube with previous systems and technologies, this invention provides a new solution which enables people to easily remove the tube or tire on the wheel, without requiring tire spoons or deflating the tube in advance. Therefore, the present invention accelerates the process of tire/tube removing or repair.

What is claimed is:

1. A rim quick release apparatus for bicycle tire or tube changing, comprising:
    a wheel frame set which comprises:
    a main wheel frame comprising a main rim;
    said main rim comprising a rim well having two edges, a first rim flange vertically connecting with one edge of the rim well, another edge of the rim well having a first connecting surface;
    said main wheel frame further comprising a hub pipe, a flange is circumferentially set on a surface of the hub pipe along a direction perpendicular to the axis thereof, the surface of the hub pipe is thereby divided into two sections by said flange, said flange attached with multiple spokes which extend for connecting to the rim well;
    a sub wheel frame comprising a sub rim, said sub rim connects to the main rim by assembling said sub wheel frame with the main wheel frame;
    said sub rim comprises a second rim flange having a second connecting surface;
    said sub wheel frame further comprising a ring having multiple spokes extending to connect with said second rim flange.

2. The rim quick release apparatus for bicycle tire or tube changing of claim 1, wherein the wheel frame set further having two assembling forms, said wheel frame set is assembled by inserting a section of said hub pipe into said ring of the sub wheel frame, a position of the ring is arranged on the section of said hub pipe;
    under an attached form of the wheel frame set, said flange of the main wheel frame attaches to the ring of the sub wheel frame, said first connecting surface is thereby connected to said second connecting surface, combining the main rim and the sub rim to form a container; and
    under a released form of the wheel frame set, said flange no longer attaches to said ring and said first connecting surface no longer attaches to the second connecting surface, separating the wheel frame set to generate a gap between said first connecting surface and said second connecting surface, wherein multiple matching slots constrain said spokes of the sub wheel frame in a pre-set range.

3. The rim quick release apparatus for bicycle tire or tube changing of claim 2, further comprising:
    an inner spring set between the flange of the main wheel frame and the ring of the sub wheel frame;
    a sleeve tube having a cap, said sleeve tube mounts on said section of the hub pipe and connects to said ring of the sub wheel frame, an opening is provided on the cap as an access to an inside hollow of said hub pipe;
    a quick release hub axle which has two ends, a first end is inserted into said hub pipe from the section opposite to the one being inserted into said ring of the sub wheel frame, and penetrates through the hub pipe and the sleeve tube, a bar cap is set on said first end of the quick release hub axle and a blocking ring is set on said first end, an outer spring sets between the bar cap and the blocking ring, a quick release lever is set on a second end of said quick release hub axle;
    a bicycle fork set which contains two forks, one fork connects to the quick release hub axle on the section between said quick release lever and said hub pipe, another fork connects to the quick release hub axle on the section between said blocking ring and said outer spring;
    locking of the quick release lever compresses both the outer spring and the inner spring, said wheel frame set is thereby under the attached form; and
    releasing of the quick release lever releases both of the inner spring and the outer spring, said wheel frame set changes to released form.

\* \* \* \* \*